(12) United States Patent
An et al.

(10) Patent No.: US 11,955,591 B2
(45) Date of Patent: Apr. 9, 2024

(54) METHOD FOR MANUFACTURING SECONDARY BATTERY AND APPARATUS FOR MANUFACTURING SECONDARY BATTERY

(71) Applicant: LG Energy Solution, Ltd., Seoul (KR)

(72) Inventors: Mi Ae An, Daejeon (KR); Hyun Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 73 days.

(21) Appl. No.: 17/766,932

(22) PCT Filed: Oct. 5, 2020

(86) PCT No.: PCT/KR2020/013452
§ 371 (c)(1),
(2) Date: Apr. 6, 2022

(87) PCT Pub. No.: WO2021/071178
PCT Pub. Date: Apr. 15, 2021

(65) Prior Publication Data
US 2023/0142281 A1    May 11, 2023

(30) Foreign Application Priority Data
Oct. 7, 2019  (KR) .......................... 10-2019-0124207

(51) Int. Cl.
*H01M 50/00*  (2021.01)
*H01M 10/04*  (2006.01)

(52) U.S. Cl.
CPC .............................. *H01M 10/0409* (2013.01)

(58) Field of Classification Search
CPC .. H01M 50/491; H01M 50/46; H01M 50/446; H01M 10/052; H01M 10/0583;
(Continued)

(56) References Cited

U.S. PATENT DOCUMENTS

2004/0154160 A1    8/2004   Hong
2010/0279161 A1   11/2010   Kang et al.
(Continued)

FOREIGN PATENT DOCUMENTS

CN           1387277 A    12/2002
CN         105556735 A     5/2016
(Continued)

OTHER PUBLICATIONS

Jung et al Battery Cell Comprising Unit Cells Having Different Electrode Structures, Jul. 2015, See the Abstract. (Year: 2015).*
(Continued)

*Primary Examiner* — Cynthia H Kelly
*Assistant Examiner* — Monique M Wills
(74) *Attorney, Agent, or Firm* — Lerner David LLP

(57) ABSTRACT

The present invention relates to an apparatus and method for manufacturing a secondary battery. The method for manufacturing the secondary battery, in which a plurality of unit cells are seated on a separator sheet and folded to manufacture a folded cell, comprises: a supply step of allowing the plurality of unit cells to move through a moving unit so as to supply the unit cells toward the separator sheet; and a seating step of allowing the plurality of unit cells to sequentially drop onto a top surface of the separator sheet, wherein the unit cells are seated on the separator sheet so that the unit cells are spaced a set gap value from each other.

11 Claims, 2 Drawing Sheets

(58) Field of Classification Search
CPC ......... H01M 2220/30; H01M 2220/10; H01M 2220/20
See application file for complete search history.

(56) References Cited

U.S. PATENT DOCUMENTS

| | | | |
|---|---|---|---|
| 2012/0132697 A1 | 5/2012 | Yano et al. | |
| 2012/0175406 A1 | 7/2012 | Yano et al. | |
| 2015/0090389 A1* | 4/2015 | Min | H01M 10/0404 156/60 |
| 2021/0050626 A1 | 2/2021 | Kim et al. | |

FOREIGN PATENT DOCUMENTS

| | | | | |
|---|---|---|---|---|
| EP | 2458669 | A2 | 5/2012 | |
| EP | 3035432 | A1 | 6/2016 | |
| JP | 2017212081 | A | 11/2017 | |
| KR | 20020089716 | A | 11/2002 | |
| KR | 20080010005 | A | 1/2008 | |
| KR | 20090003823 | A | 1/2009 | |
| KR | 2011-0001295 | A | 1/2011 | |
| KR | 20140015647 | A | 2/2014 | |
| KR | 20140032601 | A | 3/2014 | |
| KR | 20140142791 | A | 12/2014 | |
| KR | 20150064467 | A | 6/2015 | |
| KR | 20150084179 | A * | 7/2015 | .......... H01M 50/491 |
| KR | 20160076796 | A | 7/2016 | |
| KR | 20160148148 | A | 12/2016 | |
| KR | 101764718 | B1 | 8/2017 | |
| KR | 20190091745 | A | 8/2019 | |

OTHER PUBLICATIONS

International Search Report for PCT/KR2020/013452 dated Jan. 14, 2021. 3 pgs.
Extended European Search Report for Application No. 20874993.7 dated Apr. 26, 2023. 6 pgs.

* cited by examiner

METHOD FOR MANUFACTURING SECONDARY BATTERY AND APPARATUS FOR MANUFACTURING SECONDARY BATTERY

CROSS-REFERENCE TO RELATED APPLICATION

The present application is a national stage entry under 35 U.S.C. § 371 of International Application No. PCT/KR2020/013452, filed on Oct. 5, 2020, which claims priority from Korean Patent Application No. 10-2019-0124207, filed on Oct. 7, 2019, the disclosures of which are hereby incorporated by reference in their entireties.

TECHNICAL FIELD

The present invention relates to a method for manufacturing a secondary battery and an apparatus for manufacturing a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the case of the stack/folding type electrode assembly according to the related art, it is difficult to adjust unit cells to be disposed spaced a certain distance from each other on the separation film. For example, bicells are seated on the separation film through a gripper, and winding is performed after adjusting a gap between the bicells. However, it is limited to adjust the bicells to be spaced a desired gap from each other by the gripper.

If a distance between the unit cells disposed on the separation film in an unfolded state is not uniform, a position error in which the laminated unit cells vertically disposed when the unit cells are laminated are mutually misaligned may occur to cause a problem in which extraction due to non-charging or overcharging at each misaligned overhang portion occurs.

[Prior Art Document]: (Patent Document) Korean Patent Publication No. 10-2014-0015647

DISCLOSURE OF THE INVENTION

Technical Problem

One aspect of the present invention is to provide a method for manufacturing a secondary battery and an apparatus for manufacturing a secondary battery, through which unit cells are disposed spaced a set gap value from each other on a separation sheet that is in the unfolded state when the secondary battery is manufactured.

Technical Solution

A method for manufacturing a secondary battery, in which a plurality of unit cells are seated on a separator sheet and folded to manufacture a folded cell, according to an embodiment of the present invention comprises: a supply step of allowing the plurality of unit cells to move through a moving unit so as to supply the unit cells toward the separator sheet; and a seating step of allowing the plurality of unit cells to sequentially drop onto a top surface of the separator sheet, wherein the unit cells are seated on the separator sheet so that the unit cells are spaced a set gap value from each other.

An apparatus for manufacturing a secondary battery, in which a plurality of unit cells are seated on a separator sheet and folded to manufacture a folded cell, according to an embodiment of the present invention comprises: a moving unit configured to allow the plurality of unit cells to move so as to supply the unit cells toward the separator sheet; and a support part configured to allow the plurality of unit cells to sequentially drop onto a top surface of the separator sheet, wherein the unit cells are seated on the separator sheet so that the unit cells are spaced a set gap value from each other.

Advantageous Effects

According to the present invention, when the secondary battery is manufactured, the unit cells may drop onto the separator sheet that is in the unfolded state so that the unit cells are disposed spaced the set gap value from each other on the separator sheet. Therefore, when the unit cells are folded to be stacked, the misaligned positional error between the unit cells that are disposed vertically may be prevented from occurring.

MODE FOR CARRYING OUT THE INVENTION

Figure 1:
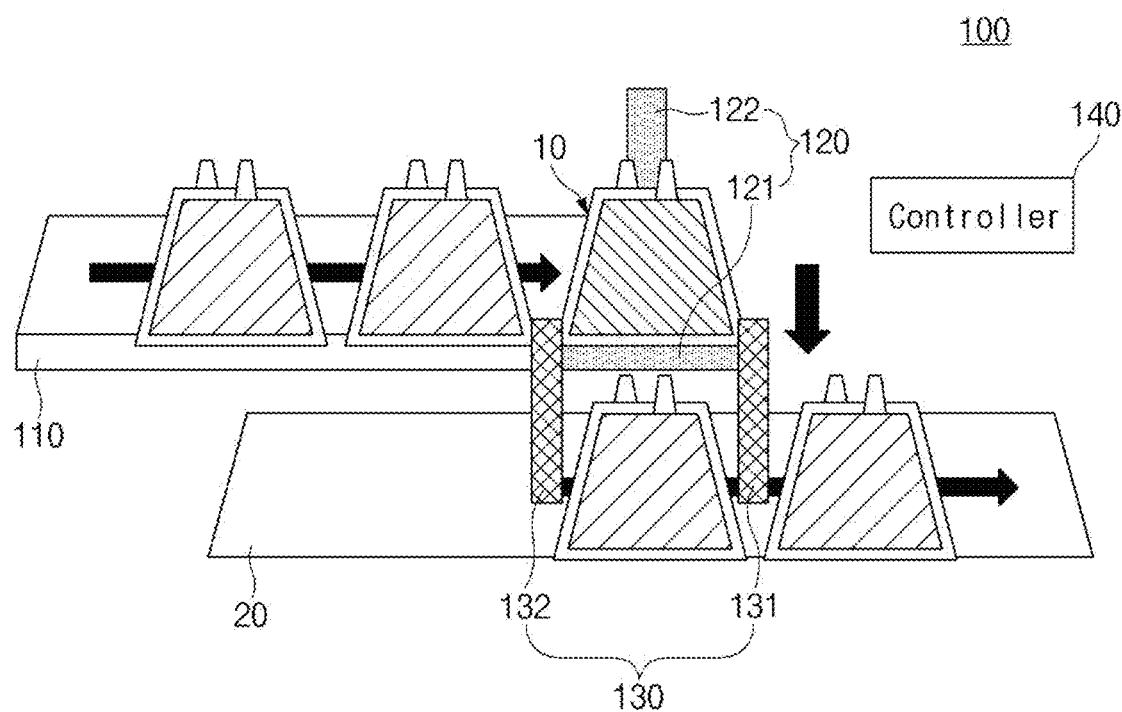
FIG. 1 is a perspective view illustrating a supply step of a method for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
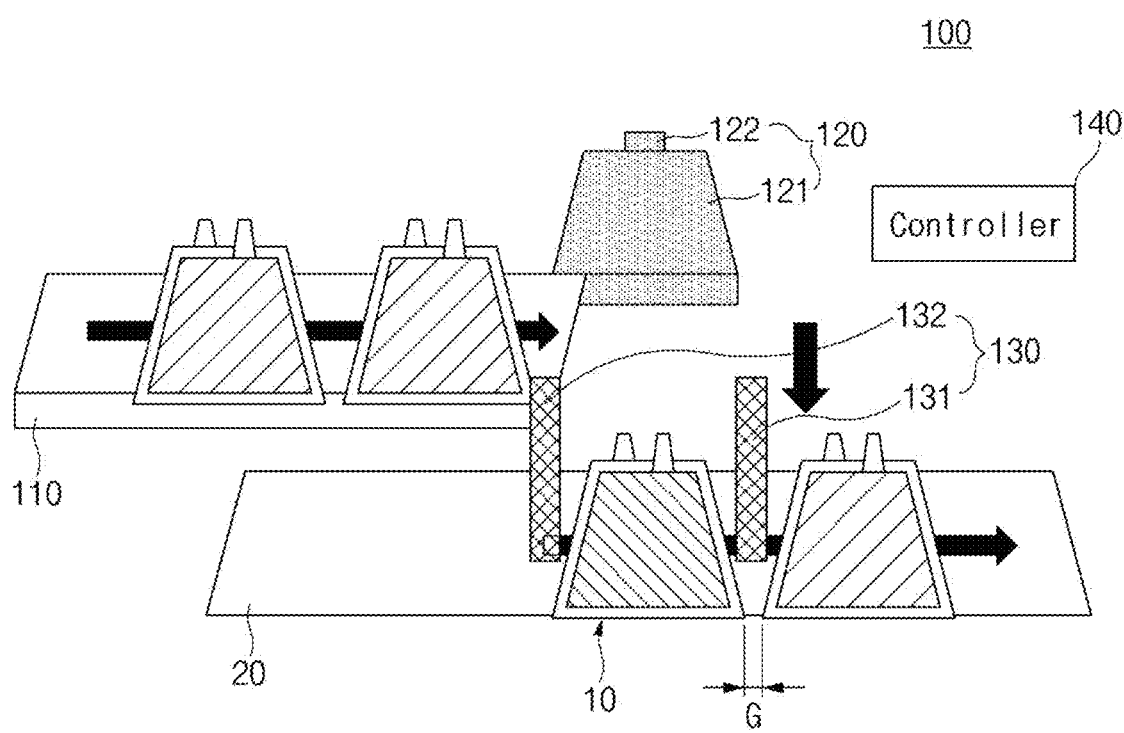
FIG. 2 is a perspective view illustrating a seating step of a method for manufacturing a secondary battery according to an embodiment of the present invention.

FIG. 1 is a perspective view illustrating a supply step of a method for manufacturing a secondary battery according to an embodiment of the present invention, and FIG. 2 is a perspective view illustrating a seating step of a method for manufacturing a secondary battery according to an embodiment of the present invention.

Referring to FIGS. 1 and 2, a method for manufacturing a secondary battery according to an embodiment of the present invention comprises a supply step of supplying a plurality of unit cells 10 toward a separator sheet 20 and a seating step of seating the unit cells 10 on the separator sheet 20.

In more detail, the method for manufacturing the secondary battery according to an embodiment of the present invention is a method for manufacturing a secondary battery, in which a plurality of unit cells 10 are seated on a separator sheet 20 and then folded to manufacture a folded cell.

Here, the folded cell is a power generation element that is chargeable and dischargeable.

Also, each of the unit cells 10 may have a shape in which electrodes and separators are alternately stacked. The electrodes may comprise a positive electrode and a negative electrode. Also, each of the separators separates the positive electrode from the negative electrode to electrically insulate the positive electrode from the negative electrode. Accordingly, the unit cell 10 may comprise at least one positive electrode, at least one negative electrode, and at least one separator.

The positive electrode may comprise a positive electrode collector and a positive electrode active material applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector and a negative electrode active material applied to the negative electrode collector. For example, the negative electrode collector may be provided as foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separators may be alternately stacked with respect to the positive electrode and the negative electrode, each of which is made of an insulation material. Each of the separators may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

Referring to FIG. 1, in the supply step, a plurality of unit cells 10 may move through a moving unit 110 so as to be supplied toward the separator sheet 20.

Also, in the supply step, the unit cell 10 may move using a conveyor belt as the moving unit 110.

The moving unit 110 may be disposed in a direction parallel to the separator sheet 20, but may be disposed above the separator sheet 20.

Also, the moving unit 110 may allow the unit cell 10 to move in the same direction as the moving direction of the separator sheet 20.

Referring to FIG. 2, in the seating step, the plurality of unit cells 10 may sequentially drop onto a top surface of the separator sheet 20, and also, the unit cells 10 may be seated to be spaced a set gap value from each other on the separation sheet 20. Here, the set gap value may be a distance of a gap G between the unit cells 10. (FIGS. 1 and 2 illustrate perspective views of a shape in which a width of each of the unit cells 10 at a front side is wider than that of the unit cell at a rear side, but the unit cells may have the same width. That is, in the drawings, the unit cell 10 is shown like a trapezoidal shape, but may have a rectangular shape.)

Also, in the seating step, when the unit cell 10 drops onto the separator sheet 20, the unit cell 10 dropping through a guide part 130 may be guided.

Here, in the seating step, the guide part 130 may comprise a plurality of guide bars 131 and 132, and when the unit cell 10 drops, the plurality of guide bars 131 and 132 may guide front and rear ends of the unit cells 10 with respect to a traveling direction.

Here, the plurality of guide bars 131 and 132 may be disposed spaced apart from each other by a distance corresponding to the width of the unit cell 10.

Also, the plurality of guide bars 131 and 132 may be formed, for example, in a square beam or a column shape. Here, a surface of each of the plurality of guide bars 131 and 132, which face the unit cell 10, may be formed in a shape corresponding to a side surface of the unit cell 10.

In addition, in the seating step, after supporting a lower portion of the unit cell 10, which moves through the moving unit 110, by disposing the support part 120 at an end of the moving unit 110, the support part 120 may move in a lateral direction with respect to the traveling direction of the unit cell 10 to release the support of the unit cell 10 so that the unit cell 10 drops.

Also, in the seating step, the support part 120 may comprise a support plate 121, on which the unit cell 10 is seated, to allow only the support plate 121 to move in the lateral direction so that the unit cell 10 seated on the support plate 121 drops. Here, the support plate 121 may move to reduce friction when the support plate 121 moves, thereby preventing the unit cell 10 from moving together in the lateral direction.

Here, the support plate 121 may move at a high speed, and the unit cell 10 may not move in the lateral direction.

Also, the support plate 121 may move horizontally at a high speed so that the unit cell 10 drops while being maintained in a horizontal state. Alternatively, the support plate 121 may move in the lateral direction while being gradually inclined so that the separated unit cells 10 receive a less impact.

Also, for example, a height of a seating surface of the support plate 121, on which the unit cell 10 is seated, may be the same as that of a seating surface of the moving unit, on which the unit cell 10 is seated to move, and thus, the seating surfaces may be connected to each other without a stepped portion.

Furthermore, in the seating step, after the separator sheet 20 moves so that the set gap value is reflected, the unit cell 10 may drop onto the separator sheet 20 in a state in which the separator sheet 20 is stopped and then may be seated on the separator sheet 20.

In addition, the seating step may comprise a process of allowing an n-th unit cell 10 to drop onto the stopped separator sheet 20 so as to seat the n-th unit cell 10, a process of allowing the separator sheet 20 to move by the set gap value and stopping the separator sheet 20 after the n-th unit cell 10 is seated, and a process of allowing an (n+1)-th unit cell 10 to drop onto the stopped separator sheet 20 so as to seat the (n+1)-th unit cell 10. (Here, n is a natural number)

In more detail, in the seating step, for example, a process (a) of allowing a first unit cell 10 to drop onto the separator sheet 20 so as to seat the first unit cell 10, a process (b) of allowing the separator sheet 20 to move by a set gap value and stopping the separator sheet 20 after seating the first unit cell 10, and a process (c) of allowing a second unit cell 10 to drop onto the stopped separator sheet 20 so as to seat the second unit cell 10 may be repeatedly performed, and the second unit cell 10 and a third unit cell 10 may be sequentially seated on the separator sheet 20.

Referring to FIGS. 1 and 2, in the method for manufacturing the secondary battery, which is configured as described above, when the secondary battery is manufactured, the plurality of unit cells 10 may move through the moving unit 110 toward the separator sheet 20, and the moving unit cells 10 may drop onto the separator sheet 20 by a set gap value so that the unit cells 10 are disposed spaced the set gap value from each other on the separator sheet 20 that is in an unfolded state. Thus, when the unit cells 10 are folded to be stacked, it is possible to prevent misaligned positional errors between the vertically stacked unit cells 10 from occurring.

Hereinafter, an apparatus for manufacturing a secondary battery according to an embodiment of the present invention will be described.

Referring to FIGS. 1 and 2, an apparatus 100 for manufacturing a secondary battery according to an embodiment of the present invention may comprise a moving unit 110 configured to supply a plurality of unit cells 10 to a separator sheet 20 and a support part 120 configured to allow the plurality of unit cells 10 to sequentially drop onto a top surface of a separator sheet 20 and seat the unit cells 10 on the separator sheet 20 so that the unit cells 10 are disposed spaced a set gap value from each other. In addition, the apparatus 100 for manufacturing the secondary battery according to the embodiment of the present invention may further comprise a guide part 130 configured to guide the dropping unit cell 10.

The apparatus 100 for manufacturing the secondary battery according to an embodiment of the present invention is an apparatus 100 for manufacturing a secondary battery, which is applied to the method for manufacturing the secondary battery according to the foregoing embodiment of the present invention. Thus, in descriptions of the apparatus 100 for manufacturing the secondary battery according to this embodiment of the present invention, contents duplicated with the method for manufacturing the secondary battery according to forgoing embodiment of the present invention will be omitted or briefly described, and also, differences therebetween will be mainly described.

In more detail, the apparatus 100 for manufacturing the secondary battery according to an embodiment of the present invention is an apparatus 100 for manufacturing a secondary battery, in which a plurality of unit cells 10 are seated on a separator sheet 20 and then folded to manufacture a folded cell.

A moving unit 110 may allow a plurality of unit cells 10 to move and then supply the unit cells 10 toward a separator sheet 20.

In addition, the moving unit 110 may be provided as a conveyor belt so that the plurality of unit cells 10 move.

Furthermore, the moving unit 110 may be disposed in a direction parallel to the separator sheet 20, but may be disposed above the separator sheet 20.

Also, the moving unit 110 may allow the unit cell 10 to move in the same direction as the moving direction of the separator sheet 20.

The support part 120 may allow the plurality of unit cells 10 to sequentially drop onto a top surface of the separator sheet 20. Here, the unit cells 10 may be seated to be spaced a set gap value from each other on the separation sheet 20.

In addition, the support part 120 may be disposed at an end of the moving unit 110 to support a lower portion of each of the unit cells moving through the moving unit 110. Then, the support part 120 may move in a lateral direction with respect to a traveling direction of the unit cells 10 to release the support of the unit cells 10 so that each of the unit cells 10 drop.

Furthermore, the support part 120 may comprise a support plate 121, on which the unit cell 10 is seated, to allow only the support plate 121 to move in the lateral direction so that the unit cell 10 seated on the support plate 121 drops. Here, the support plate 121 may move so that the support plate 121 does not move together with the unit cell 10 in the lateral direction by reducing friction when the support plate 121 moves. Here, the support part 120 may further comprise a support shaft 122 extending in a lateral direction of the support plate 121 to allow the support plate 121 to move through movement of the support shaft 122.

Here, for example, a height of a seating surface of the support plate 121, on which the unit cell 10 is seated, may correspond to a height of a seating surface of the moving unit, on which the unit cell 10 is seated to move. Also, as illustrated in FIGS. 1 and 2, the support plate 121 may have a shape corresponding to a size and shape of the unit cell 10.

The guide part may guide the dropping unit cell 10 when the unit cell 10 drops onto the separator sheet 20.

Also, the guide part 130 may comprise a plurality of guide bars 131 and 132, and the plurality of guide bars 131 and 132 may guide front and rear ends of the unit cell in a traveling direction when the unit cell 10 drops.

Furthermore, the guide bars 131 and 132 may be formed to extend in a vertical direction. Thus, the unit cell 10 dropping downward from an upper side may be seated on the separator sheet 20 without a positional error.

Here, the plurality of guide bars 131 and 132 may be disposed spaced apart from each other by a distance corresponding to the width of the unit cell 10.

Also, the plurality of guide bars 131 and 132 may be formed, for example, in a square beam or a column shape. Here, a surface of each of the plurality of guide bars 131 and 132, which face the unit cell 10, may be formed in a shape corresponding to a side surface of the unit cell 10. Each of the guide bars 131 and 132 may have a shape that is a width gradually narrowed as it goes down. In this case, the unit cell 10 may be accurately guided to a predetermined seating point while being easily inserted into the guide part 130.

The apparatus 100 for manufacturing the secondary battery according to an embodiment of the present invention may further comprise a controller 140 configured to control movement and stop of the separator sheet 20 in the traveling direction.

Also, when the unit cell 10 moving through the moving unit 110 drops and is seated on the separator sheet 20, the controller 140 controls an amount of movement of the separator sheet 20 to allow the unit cells 10 to be disposed spaced a set gap value from each other, thereby seating the unit cells on the separator sheet 20.

Here, the separator sheet 20 may move, for example, through a moving unit (not shown), and the moving unit may be provided as, for example, a conveyor belt. Here, the controller 140 may control the movement of the separator sheet 20 by controlling an operation of the conveyor belt.

More specifically, for example, the controller 140 may control the moving unit 110 to allow a first unit cell 10 to move to be seated on the support part 120 and then stop the movement of the separator sheet 20 and also control the movement of the support part 120 to seat the first unit cell 10, which is seated on the support part 120, on the stopped separator sheet 20. In addition, the controller 140 may allow the separator sheet 20 to move so that a second unit cell 10 is seated to be spaced a set gap value from the first unit cell 10 (i.e., the separator sheet moves by the set gap value), and simultaneously, the second unit cell 10 may move to be seated on the support part 120. Thereafter, the controller 140 may stop the movement of the separator sheet 20 and then seat the second unit cell 10 on the separator sheet 20. The above-described processes may be repeatedly performed so that a third unit cell 10, a fourth unit cell, and the like are seated to be spaced the set gap value from each other on the separator sheet 20.

For example, in the stack/folding type electrode assembly (folded cell), the gap value may be changed as an n value of the unit cell increases. That is, as the n value of the unit cell increases, the gap value may gradually increase.

While the present invention has been particularly shown and described with reference to exemplary embodiments thereof, it is to be understood that the scope of the present invention is not limited to the method for manufacturing the Secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: Unit cell
20: Separator sheet
100: Apparatus for manufacturing secondary battery
110: Moving unit
120: Support part
121: Support plate
122: Support shaft
130: Guide part
131,132: Guide bar
140: Controller

The invention claimed is:

1. A method for manufacturing a secondary battery, in which a plurality of unit cells are seated on a separator sheet and folded to manufacture a folded cell, the method comprising:
moving the plurality of unit cells through a moving unit to supply the unit cells toward the separator sheet;
sequentially dropping the plurality of unit cells onto a top surface of the separator sheet while the separator sheet moves relative to the moving unit between successive drops of the unit cells, so that the unit cells are spaced a predetermined gap distance from each other along the top surface; and
folding the separator sheet to manufacture the folded cell.

2. The method of claim 1, wherein, during the dropping, the unit cells are guided through a guide part.

3. The method of claim 2, wherein the guide part comprises a plurality of guide bars, and during the dropping, the plurality of guide bars are configured to guide front and rear ends of the unit cells in a traveling direction.

4. The method of claim 3, wherein a support part is disposed at an end of the moving unit to support a lower portion of each of the unit cells moving through the moving unit, and during the dropping, the support part moves in a lateral direction perpendicular to the traveling direction of the unit cell to release the unit cell so that the unit cell drops.

5. The method of claim 4, wherein the support part comprises a support plate, on which the unit cell is seated during the dropping, the support plate only moving in the lateral direction, wherein the support plate has a sufficiently low friction with respect to the unit cells, so that the unit cells do not move together with the support plate in the lateral direction when the support plate moves.

6. The method of claim 1, wherein, during the dropping, after the separator sheet moves by the predetermined gap distance, the separator sheet stops while each successive one of the unit cells drops onto the separator sheet.

7. The method of claim 6, wherein the dropping comprises:
a process of allowing an n-th one of the unit cells to drop onto the stopped separator sheet so as to seat the n-th unit cell;
a process of allowing the separator sheet to move by the predetermined gap distance and stopping the separator sheet after the n-th unit cell is seated; and
a process of allowing an (n+1)-th unit cell to drop onto the stopped separator sheet so as to seat the (n+1)-th unit cell.

8. An apparatus for manufacturing a secondary battery using the method of claim 1, the apparatus comprising:
the moving unit configured to move the plurality of unit cells toward the separator sheet; and
a support part configured to sequentially drop the plurality of unit cells onto the top surface of the separator sheet while the separator sheet moves relative to the moving unit between successive drops of the unit cells, so that the unit cells are spaced the predetermined gap distance from each other along the top surface.

9. The apparatus of claim 8, further comprising a guide part configured to guide the unit cells while the unit cells drop from the moving unit onto the separator sheet.

10. The apparatus of claim 9, wherein the guide part comprises a plurality of guide bars configured to guide front and rear ends of the unit cells in a traveling direction extending from the moving unit towards the separator sheet.

11. The apparatus of claim 10, wherein the support part is disposed at an end of the moving unit and is configured to support a lower portion of each of the unit cells moving through the moving unit, and the support part is configured to move in a lateral direction perpendicular to the traveling direction, thereby releasing support of each successive one of the unit cell so that each respective unit cell drops onto the top surface of the separator sheet.

* * * * *